Patented July 23, 1929.

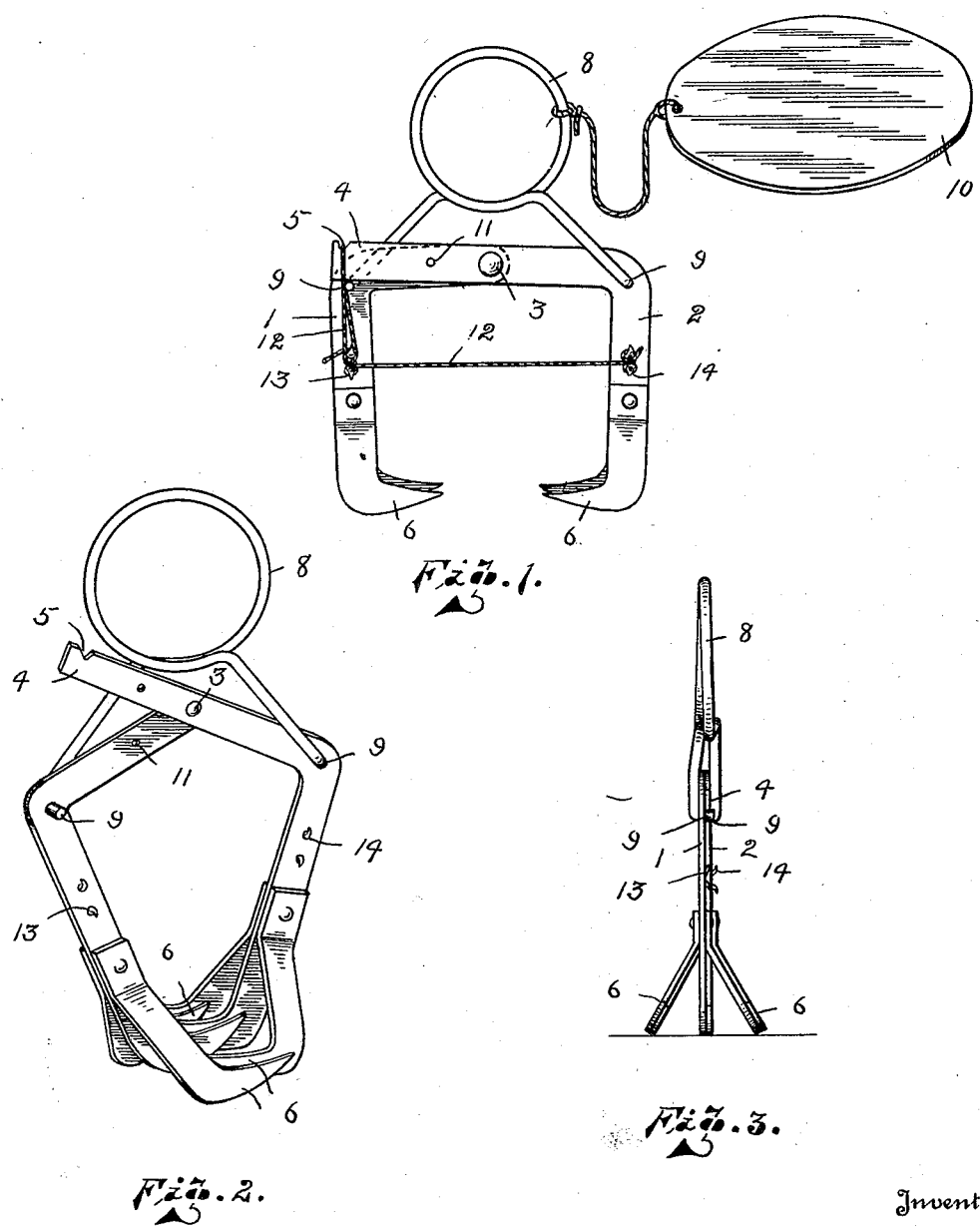

1,721,946

UNITED STATES PATENT OFFICE.

JOHN J. DANIELS, OF MINNEAPOLIS, MINNESOTA.

GOPHER TRAP.

Application filed September 29, 1927. Serial No. 222,755.

This invention relates to traps, and has special reference to one particularly adapted for use in catching gophers or the like, the specific invention residing in certain improvements upon similar traps previously patented to me.

The principal object of my present invention is to provide a novel combination of elements having functions other than those shown in my prior patents, particularly in that the novel shape of the gripping jaws will cause as instantaneous death as possible to the animal being caught and thus provide a most humane trap.

Other objects and advantages of the invention will appear in the further description thereof.

Referring now to the accompanying drawing, forming part of this application, and wherein like reference characters indicate like parts:

Figure 1 is a front elevation of one of the improved traps as it appears when set;

Figure 2 is a perspective view of the trap when closed; and

Figure 3 is a side elevation taken at right angles to Figure 1.

The trap proper comprises two rigid right angularly shaped members 1 and 2, pivotally united as at 3, the member 2 having a handle like extension 4 which overreaches the adjacent portion of the member 1, and near its terminus is provided with a notch 5, the object of which will be described later. The lower extremities of these right angularly shaped members are each provided with a pair of downwardly and outwardly inclined L-shaped jaws 6 which coincide in form to the sharpened extremities of each member 1 and 2, they being spaced apart to point towards each other, though when sprung and in gripping engagement overreach each other as clearly shown in Figure 2 of the drawing, such overreaching effect being provided for the express purpose of severing the vitals of an animal being caught therein and quickly causing death.

The springing action of the members 1 and 2 is accomplished by the circularly shaped spring 8 disposed over the pivotal connection of the members with its termini attached one within the elbow of each member as at 9; this spring preferably consisting of a single helical turn and so formed as to have a constant stress inwardly on its termini, and forms both a convenient handle for the trap and means for attachment of the circularly shaped hole covering plate 10, which I prefer to make of a piece of thin sheet metal and provides an ideal cover for the mouth of the hole in which the trap is set and need not necessitate being removed from engagement with the handle.

The extension 4 of the L-shaped member 2, together with the adjacent portion of the member 1, are each provided with suitable holes 11 which register when the trap is set as shown in Figure 1 and into which a nail or other object may be conveniently inserted for holding the trap in such set condition until the string indicated at 12 is attached first in the laterally projecting tits 13 on the member 1 and then extends upwardly and over the extension 4 within the notch 5, thence back down to the tits 13 and across to similarly shaped tits 14 on the member 2 where it may be secured in any manner desired and when the nail or pin through the holes 11 may be withdrawn and the trap thus held set by the string. When the trap is placed in the hole of a burrowing animal the string will extend transverse same to be cut by the animal at which time it is obvious the latter will ordinarily become caught in the trap and instantly killed.

Having thus described my invention, what I claim and desire to secure by Letters Patent, is:

The combination with a trap of the character described having a handle-like portion, said trap being designed for fitting within a hole in the ground, of a disc-like cover for said hole tethered to the handle of the trap for the purpose described.

In testimony whereof I affix my signature.

JOHN J. DANIELS.